(12) United States Patent
Zanesi

(10) Patent No.: US 12,333,360 B2
(45) Date of Patent: Jun. 17, 2025

(54) RFID SYSTEM SUITABLE FOR BEING ATTACHED TO FABRICS AND METHOD FOR THE DIGITALIZATION OF FABRICS

(71) Applicant: ME Innovation SRL, Manocalzati (IT)

(72) Inventor: Davide Zanesi, Lecco (IT)

(73) Assignee: ME Innovation SRL, Manocalzati (IT)

( * ) Notice: Subject to any disclaimer, the term of this patent is extended or adjusted under 35 U.S.C. 154(b) by 104 days.

(21) Appl. No.: 18/143,096

(22) Filed: May 4, 2023

(65) Prior Publication Data

US 2023/0359848 A1 Nov. 9, 2023

Related U.S. Application Data

(62) Division of application No. 16/493,762, filed on Sep. 13, 2019, now Pat. No. 11,663,434.

(51) Int. Cl.
| | |
|---|---|
| *G06K 19/02* | (2006.01) |
| *B32B 37/06* | (2006.01) |
| *B32B 37/12* | (2006.01) |
| *B32B 38/00* | (2006.01) |
| *G06K 19/07* | (2006.01) |
| *G06K 19/077* | (2006.01) |

(52) U.S. Cl.
CPC ............ *G06K 19/027* (2013.01); *B32B 37/06* (2013.01); *B32B 37/1207* (2013.01); *B32B 38/0004* (2013.01); *G06K 19/025* (2013.01); *G06K 19/0723* (2013.01); *G06K 19/07728* (2013.01); *G06K 19/07762* (2013.01); *G06K 19/07786* (2013.01); *B32B 2519/02* (2013.01)

(58) Field of Classification Search
CPC . B32B 37/06; B32B 37/1207; B32B 38/0004; B32B 2519/02; G06K 19/025; G06K 19/0723; G06K 19/07728; G06K 19/07762; G06K 19/07786
See application file for complete search history.

(56) References Cited

FOREIGN PATENT DOCUMENTS

| EP | 1605397 A2 * | 12/2005 | ....... G06K 19/07756 |
|---|---|---|---|
| EP | 1739597 A2 * | 1/2007 | ........... G06K 19/027 |

* cited by examiner

*Primary Examiner* — Vishal I Patel
(74) *Attorney, Agent, or Firm* — Jose Cherson Weissbrot

(57) ABSTRACT

The present invention refers to the field of electronic devices, with reference to the radio transmission and reception field operating in radiofrequency and, more particularly, to the TAG field operating in RFID technology. In particular, the present invention deals with RFID communication devices preferably applied or realized on rigid or semi-rigid supports, with particular reference to textile supports. Even more particularly, the present invention intends to improve and enhance an invention described by the same applicant in a previous application mentioned in the description. Similar to at least some of the objects described in the invention mentioned above, also the present invention has, among others, the purpose of describing a method and a relative innovative electronic system, suitable for being made, or solidarily fixed to a rigid or semi-rigid support, in particular with reference to certain types of textile supports suitable for the purpose, which will be the object of some preferred embodiments described hereinbelow.

9 Claims, 4 Drawing Sheets

Figure 3A:
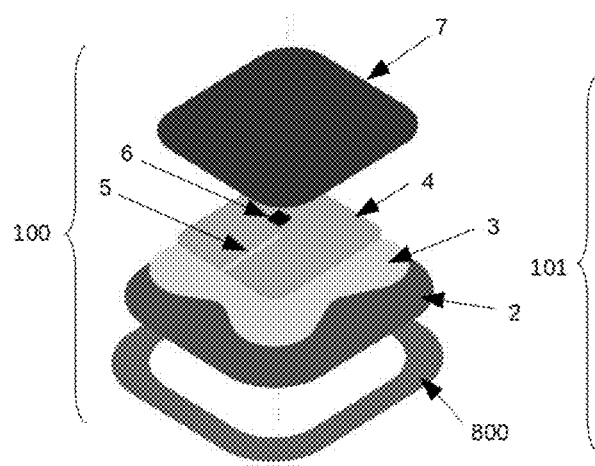

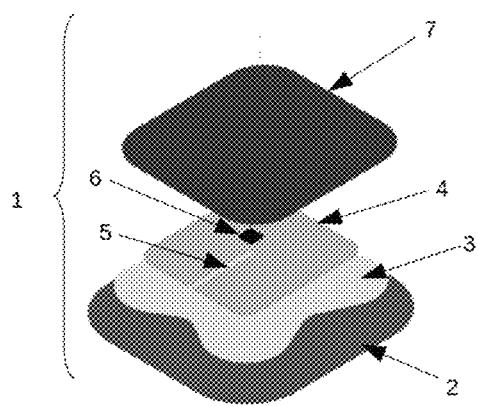
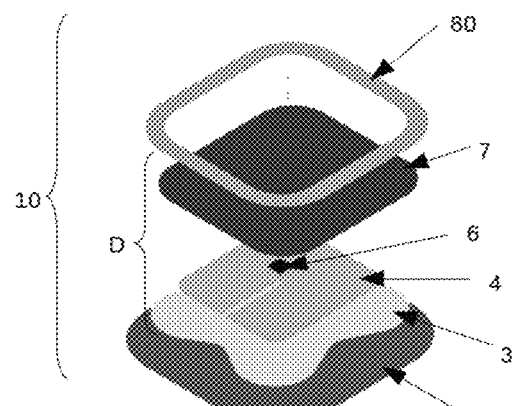
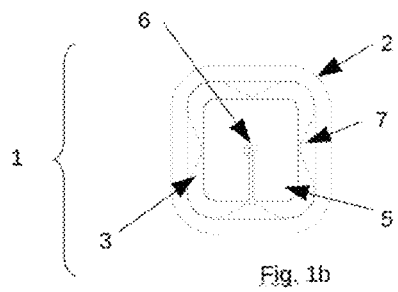
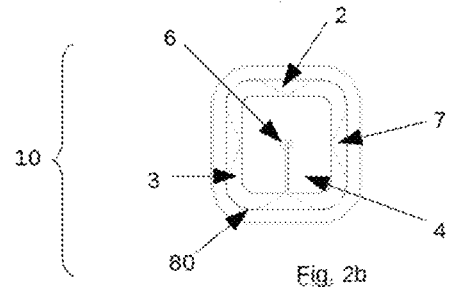

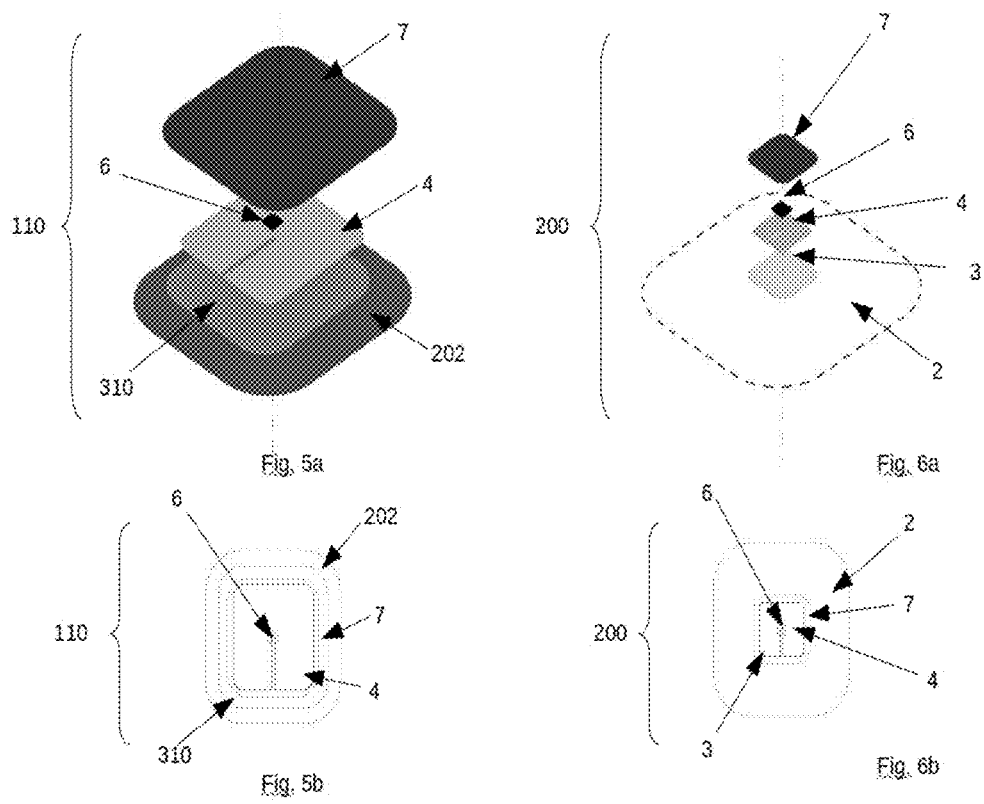

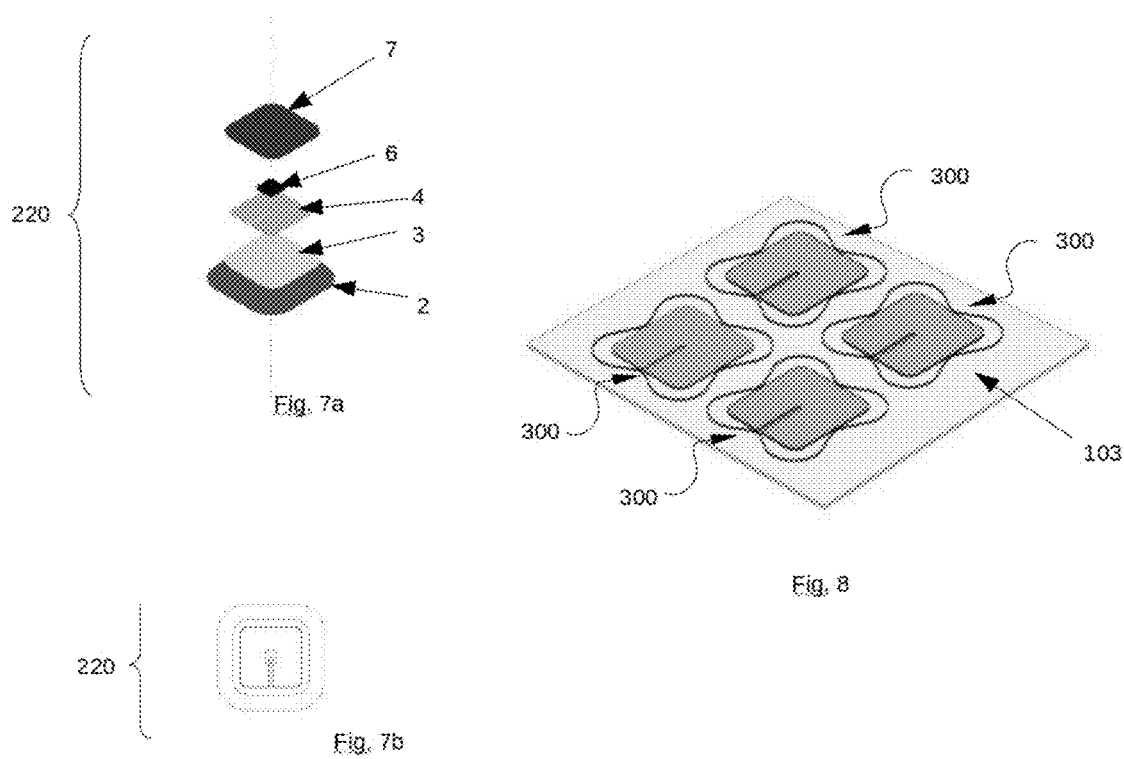

RFID SYSTEM SUITABLE FOR BEING ATTACHED TO FABRICS AND METHOD FOR THE DIGITALIZATION OF FABRICS

The present invention refers to the field of electronic devices, with reference to the field of transmission and reception of data operating in radiofrequency and, more particularly, to the sector of TAGs operating in RFID technology.

In particular, the present invention deals with RFID communication devices preferably applied or realized on rigid or semi-rigid supports, with particular reference to textile supports.

Even more particularly, the present invention intends to improve and refine on an invention described by the same applicant in the patent application n. 102015000055504 of 25 Sep. 2015.

Similar to at least some of the objects described in the invention cited above, the present invention also has among others the purpose of describing a method and an innovative electronic system, suitable for being made, or solidarily fixed to a rigid or semi-rigid support, in particular with reference to certain types of textile supports suitable for the purpose, which will be the object of some preferred embodiments hereinafter described.

Taking a step back, the problems to which the previous patent application intended to give a solution are going to be briefly summarized (problems which will be solved even more brilliantly and innovatively by the present patent application).

As it is known, usually when it comes to electronic devices made on textile supports, radio frequency devices are taken into consideration.

Usually this technology uses an electromagnetic signal having a standardized frequency, from 125 KHz to 5.8 GHz (for example 13.56 MHz in the NFC coding), to exchange information from a reader device to a tag device in a contactless manner. Since the tag device is generally without its own power supply and is therefore powered by the carrier coming from the reader, it is obvious that the energetic coupling of the two devices is fundamental.

Being instead the antennas commonly used in RFID or NFC very small compared to the values usually evaluated in the field of antenna theory, the problem is treated from the point of view of the coupling of fields between the two devices, rather than from the point of view of antennas and electromagnetic fields.

These are essentially among the fundamental reasons for the limited operating range of NFC technology.

NFC technology is therefore commonly used for short-range contactless communications based on standard radio frequency identification (RFID) using magnetic field induction to enable communication between electronic devices, including mobile wireless communication devices.

Such short-range communications (on average a few centimeters) are usually used by portable communication devices to replace Wi-Fi or Bluetooth solutions for payment and purchase services, for electronic keys, for device identification or configuration services or for sharing of information.

To date, products using NFC technology have rigid or semi-rigid supports. For example, commonly NFC devices are mounted on plastic supports made of polymer (the most used are PET and PU). The variants currently present in this solution provide either the replacement of the plastic support with a paper support, or the assembly on polymeric supports and then the coupling to a fabric (for example, the coupled tags, as in the case of smart labels).

However, it is now known to those skilled in the art that the creation of an NFC device on a rigid or semi-flexible support presents, both during construction and in subsequent practical use, multiple problems, which have caused impediments on the realization of projects with this technology, both for economic reasons and for feasibility limits.

Among other things, some important problems concern: the existing NFC devices to date are made by printing or coupling a spiral-shaped conductive layer on a polymer (or different support). In order to work, the antenna must be dimensioned correctly to obtain an inductance capable of reacting to the transmission wavelength (i.e. 13.6 MHz in this case). As a consequence, conductive loops are generated and all the measurements are calculated.

At the end of the loop an electronic chip is soldered or glued. As stated in many texts, conductive traces created on flexible supports must comply with rules that impose a limit on tolerable folds. Consequently, it follows that these traces are not very resistant to bending, especially the lateral ones. It is known to the skilled in the field that it has been highlighted how the breaks of the tags were often linked to the failure of the soldering of the chip on the conductive tracks.

The compression of the fabric, the traction, the folds under stress, the shocks, cause cracks or real breaks of the welds. This actually involves breaking of the device.

Moreover, the coil composition by which the electronic circuit is printed and the positioning of the microchip by welding or gluing make the whole device extremely fragile and vulnerable. The breaking or tampering of only one of the turns, as well as the detachment of the chip, involve the inoperability of the entire NFC system, consequently its delicacy implies the renunciation of use in various areas.

Another negative factor related to the existing NFC concerns the support in rigid or semi-flexible material on which the same device is printed, which limits its flexibility and consequently the number of possible applications.

This with regard to the prior art useful for describing some of the technical problems solved by the previous invention which had among the purposes, as well as the present, the realization of electronic devices for rigid or semi-rigid supports resistant to use and description of a method for making such particularly advantageous devices.

A further object of the invention is to describe electronic devices for reliable rigid or semi-rigid supports.

Still another object of the previous invention, which is also found in the present improvement invention, is the realization of electronic devices for rigid or semi-rigid supports which allow the extension of the field of application of said type of devices.

Further, one and more relevant objects of the invention are to describe electronic devices for rigid or semi-rigid supports suitable for solving the problems of the device described by the applicant, previously improving the method of realization thereof.

A further object of the present invention is therefore to describe a method or process for manufacturing electronic devices for rigid or semi-rigid supports which allows to solve the above-mentioned problems of the prior art and which brings further advantages for application to such devices.

A fundamental object of the present invention is to describe a method which maintains the advantages described by the applicant above and rather considerably improves the characteristics as well as providing other advantages.

These and further objects will be realized by virtue of the method for the realization of electronic devices for rigid or semi-rigid supports which, for the realization of such devices operating in radiofrequency, uses, instead of inductive coupling, the new and particularly advantageous application of the reflection principle of the magnetic field generated by the emitter system, namely RFID reader, for the realization of such devices in particular on textile supports.

Hereinbelow will be described in detail the advantageous variants of said method, with particular reference to the improvements made with respect to the patent previously filed by the same applicant.

In a particularly advantageous way, therefore, said innovative device comprises at least one support on which it is made, said support being a rigid or semi-rigid surface, and even more preferably a fabric suitable for the purpose; said device further comprises at least one thermoadhesive dielectric layer with at least preferably a smooth and particularly innovative face, said electronic device comprises at least one shaped aluminum foil, a substantially rigid electric module and a thermoadhesive closing thermal dielectric layer, in a particularly preferred basic form of embodiment of the present invention.

It should be noted that, in a particularly advantageous manner, said shaped aluminum foil is made with a geometry that has been innovatively carefully designed to allow an optimized reflection of the electromagnetic field.

The currently proposed foil (both in the previous patent and in the current one) has a 1.5 mm slit which stops substantially in the middle of the foil. This slit. The field wave is practically completely refracted on the entire panel if not at the point where the slit has been made.

The lines of the magnetic field are redistributed along the slit. At the top of the slit, (due to the known physics rules that are not here cited) the field reverses its direction. This means that at that point, the magnetic field passes through the barrier of the foil.

By positioning the rigid module with its antenna at that precise point (the chosen antenna is preferably 3×3 mm, which fits perfectly on the slit), the magnetic field emitted by the reader activates the antenna of the module that starts to transmit. If there were no slit, the waves would not be able to cross the module and therefore it would not activate as passive. On the contrary, by exploiting the distribution of the wave that is refracted, this electromagnetic field not only activates the rigid module but it has been verified that the signal composed of the data transmitted by the module and the initial magnetic field refracted by the plate reach the reader antenna (e.g. smartphones) amplified allowing the reading of the contents of the memory of the rigid module, which otherwise would not be possible given the reduced dimensions of the antenna of the rigid module. Therefore, advantageously compared to traditional amplification systems, in particular for UHF RFID and/or NFC RFID tags, it is possible to obtain the reading of said module without the use of conductive loops which have all the known disadvantages, such as extreme fragility and short duration.

The present invention advantageously allows to realize a UHF and/or NFC RFID system of reduced dimensions and much more solid than those existing up to now.

The foil preferably will be made with sides of length suitable for the chosen application, substantially it is a basic dimension 32×35 mm. (Innovatively in the invention of improvement, 20×20 mm foils were also created (MODEL 5 and 6 described below) but also foils of 8 mm×32 mm or foils of 100×100 mm for use in industrial laundries with large reader.

The sizing derives from tests that have been carried out to obtain a constant reading with readers of even the lowest range and is not considered to be limiting for the scope of protection of the present invention.

The slit has been created up to approximately half of one of the long sides in a horizontal extension of the foil to have a centered design, which advantageously gives good operating results. The standard test foil is substantially approximately 1.5 mm×17.5 mm.

Slits that are too short tend to reduce the amount of field that passes through the slit, on the contrary, too long slits disperse the field.

Studies carried out by the applicant have shown that the thickness of the foil, advantageously, does not change the functionality of the device.

According to some calculations performed for designs of some embodiments, a thickness suitable for the purpose had to be about 30 microns (ranging substantially from 2.5 to 200 microns).

Note that with a too small thickness the device does not work because the permeability to the field is too low: so the minimum measurement to be taken is about 4-5 microns. Thicknesses that are too high instead cause a considerable stiffening of the textile structure. For example, an amplification of the signal was also detected with 2 coins of 20 cents which means thicknesses of 2 mm.

It has been possible to obtain an excellent result with excellent reliability with 14 micron aluminum foils, obtaining a high degree of flexibility, a characteristic necessary for working with fabrics and ensuring the correct functioning of the device.

Good results have also been obtained with copper (more expensive); substantially however any conductive material is suitable for creating the foil.

Said foil therefore, in a particularly advantageous way, will be able not only to block the transmission in radiofrequency, but also to amplify its effectiveness in terms, for example, of increased reading distance, increased reading area, as well as compatibility with various types of commercial readers which to date is not possible in the field.

The micro antenna present, that is the antenna made on the rigid device, (which will be defined as module in the description of the figures) is a 3×3 mm antenna on multiple layers sized to transmit at a frequency of 13.56 MHz and to create sufficient impedance for generate the potential difference capable of feeding the chip with the memory comprised therein. Given the small size, however, only the 3×3 antenna would not allow communication with readers (hence the amplification that will not be repeated).

Instead one of the important factors to be considered in order to make the most of the reflection of the magnetic field is geometry.

The geometry used has been optimized experimentally to be compatible with most readers. An aluminum foil with a surface that is too small considerably reduces the reading distance of the device and even inhibits its operation. On the contrary, a geometry that is too large tends to block the reader's wave and therefore does not allow data transfer.

(The current dimensions are approximately (32×35× 0.014) mm–Slit of (1.5×17.5) mm, all dimensioned on the antenna; dimensioning made with the less performing antennas on the market to be able to face even the worst cases).

It is noted in this regard that a plurality of TAG RFIDs are known in the art in particular UHF, suitable to be applied to clothing products in particular flexible, the document US2016/0019452 in particular describes a UHF RFID tag that is particularly robust, suitable for the purpose that can remain in the garment also during the washing and other work phases, in particular a tag is described that combines a hybrid-slot loop antenna structure with an area conductor particularly large in the form of a metal sheet.

Therefore the described panel is by all effects a dipole antenna: it is here argumenta the realization of a UFH tag suitable for being inserted in a fabric (in which an amplifying dipole antenna and a rigid UHF electronic component (hitachi im5-pk2525) is used. According the descriptions and the various models built it is noted that the device is obtained in any case between two strata of non thermosealable polymer.

This conformation shows how the device obtained will always be external to the fabric, like a normal commercial plastic tag. This disadvantageously causes the following problems: the greater rigidity of the structure because the polymers have their thickness and not being "fused" in the fabric, this remains so, and precisely because of the dimensions defined by the inventor itself "not generally large" it can be annoying for the user. Furthermore, at any time it is possible to remove said tag from the fabric in which it is sewn, so that the traceability that is to be given to the supports on which the tags are attached is lost in an extremely easy way. The sealing takes place by lamination of polymer foils.

In this regard, in general, it should be noted that the amplification of the inductive signal generated by an RFID antenna, as known, can be achieved by inductively coupling antennas sized to respond to a known frequency (13.56 MHz in case of NFC coding) but with dimensions increased. This occurs for both dipole antennas (in the case of UHF RFID) and in the case of "Loop" antennas. However, in the specific case of the frequency 13.56 MHz, while increasing the efficiency and the functionality of the tag, it does not solve the problem of the fragility and reliability of the conductive traces or of the resistance of the wire with which this "loop" is made. Consequently, this solution is never exploited in the electronic field on fabrics.

Document WO2014/204322 describes instead an RFID tag suitable to be used for linens such as sheets etc. said tag being a heat-sealable UHF tag on textile supports. This system is based on an antenna made of dipole "steel wire". Various antenna geometries are represented. The materials used are basic thermoadhesive but the whole product is a device in itself, suitable to be connected to a fabric, so with the above problems, and also in this case that the antenna made of fabric through a wire is quite identical in operation and performance as the previously described document, for which being a UHF Tag, with the only difference being the geometry used.

Furthermore, document EP 1 605 397 in particular describes a method for obtaining printed aluminum dipole antennas with special geometries capable of amplifying the signal of a Tag IC. This device is made of polymeric supports, and no reference is made to fabrics or the like. This is generally defined as an IC Chip that is not welded on the geometry of the antennas presented.

This patent has the purpose of presenting a series of geometries for antennas on which the electronic die is welded. This is a traditional UHF plastic tag. Such tags as known can be used to track products remotely. In this constructive conformation, the tags are not suitable to be applied to the fabrics because of their low mechanical resistance.

Finally, with reference to EP 1 739 597, this document describes a method for constructing a wireless IC tag, in particular this tag being UHF and created inside a silicone system containing two antennas suitable for signal amplification, it is indicated that the product is waterproof, therefore suitable to be used on fabric In particular in this case the construction technique provides the protection of the device inside a thick layer of silicone that reduces flexibility by increasing the resistance to creases, besides of protecting from water. However, it is noticeable how the device often turns out to be not very flexible and of a very different nature from a possible textile support.

It is therefore clear that the systems/methods mentioned herein are suitable only for the realization of UHF TAG since all devices have dipole antennas and in no patent are mentioned loop antennas.

On the contrary, in particular, among the aims of the present invention there is a description of a suitable device and method for RFID TAGs, in particular NFC and HF, this because as is known to experts in the field, the HF and NFC tags are readable at reduced distances (improving privacy), can also be read when in contact with liquids (as opposed to UHF tags) and above all allow to interface with most of the commercial smartphones on the market.

In fact it is completely anomalous, or even discouraged, to put a metallic element and therefore reflective under an NFC tag. In support of this thesis, it should be noted that on the market there are NFC and HF tags (therefore operating at 13.56 MHz) shielded with ferromagnetic materials so as to make them work also on metallic products. On the other hand, shaping the foil or metal panel in a functional way, most of the emitted wave is reflected except at the specific point where the rigid electronic module is placed. At that point the wave manages to cross the device, urging the module and the overall signal comes out amplified, exploiting the waves refracted around it. This is completely new in the NFC and HF fields.

In a particularly advantageous way, in the embodiment of the innovative device described by the present invention, the process or method for digitalizing fabrics is a fundamental part of obtaining a plurality of advantageous characteristics which characterize the innovative fabric memory system described hereinafter. With reference to the patent application previously filed by the applicant, in the present patent application the same principle of reflection of the magnetic field is advantageously used, for the reasons described above.

Regarding the steps of the innovative process, the advantage of direct application of a metal foil on a fabric, or the application following the laying of a dielectric and water-repellent polymeric material, provide a multilevel structure which improves the overall characteristics of the device. itself or, in a particularly advantageous manner, confer greater resistance to breakage of the metallic reflecting screen on the fabric. In addition, the substrate created by the base dielectric layer, which is fixed on the fabric on one side and leaves a smooth surface on which we place the sheet, improves the adhesion of the metal layer on the fabric, thus decreasing the humidity that passes through the barrier created by the layers, increasing the life time of the device.

It should be noted that in the previous patent solutions had also been proposed without base bottoms, such solutions were found to be disadvantageous, so in the present patent application the base bottom will always be advantageously present to give structure to the device, as it will be better explained below.

Further, there are no welds in the electronic device described in the previous invention, as well as in the fabric memory system described in the present invention, this because the fundamental parts of the system and the related device both before and now are fixed by different methods, less problematic from the point of view of breakdowns.

Particularly advantageously, it is intended to describe with detail in the present patent application for improvement the realization of a fabric memory system comprising an electronic device comprising some advantageous features described previously but including further innovative features to make the memory system for fabrics further performing and to solve some problems found in the previous patent application.

Similarly, it is intended to describe with detail in the present patent application for improvement a process for the digitization of the fabrics comprising some advantageous features described above but which is further performing and resolves some problems encountered in the previous patent application.

So, however advantageous was the original procedure, studies and tests have allowed to realize many innovative variations with respect to the previous invention; in a particularly advantageous way the present invention of improvement comprising a manufacturing method and relative system/device and one or more variants of the process and system/device and in an innovative way comprises the use of polyester fabrics which must have certain characteristics, namely degree of elongation substantially null or null, it has been verified that this characteristic is extremely relevant, since the fabric is the only mechanical element able to keep the innovative electronic device in shape. In fact, by using for example any fabric not adherent to the characteristics here specified as the first base layer, the dielectric materials used for the dielectric layer and the aluminum foil would not have structural support and could stretch or deform causing disruption of the electronic device. Therefore, the material chosen as the base, in this case the fabric, must have at least the characteristics indicated above to give advantageously support and structural solidity to the electronic device, whereby the fabric will be part of the process in some particularly innovative variants subject of the present patent of improvement.

In particular, the innovative process object of the present invention advantageously comprises the application of a dielectric element layer, the type of materials preferably used fall within the group of the thermoadhesive or thermoplastic polyurethanes (TPU), and in an even more particular and innovative way, said dielectric layer is fixed on the base (or preferably on the fabric) exclusively by hot application with heat press, this because it has been verified that by applying the device to a t-shirt, for example, when the garment is washed and subsequently ironed due to the TPU numerous wrinkles or folds are created in the area where the device is fixed, using instead hot pressing this problem decreases significantly.

In the previous patent the dielectric layer could be applied, for example, with:
  screen printing technique: it has been verified that it gives good results by applying a large number of layers of dielectric material. At the sight it looks like a varnish and to have a sufficient layer it is necessary to make more passages, however, disadvantageously more layers are more expensive in production and cause processing problems and moreover, with time, the folds of the fabric could create cracks and therefore not properly seal the device;
  ink-jet printing: it is a very slow process that cannot create a thick layer of dielectric material able to effectively support the metal foil as the ink penetrates into the fabric. In particular, ink-jet printing, unlike screen printing, for example where the materials are "pasty", allows the storage of dielectric materials in liquid form. This liquid penetrates inside the weft and warp of the fabric to obtain a "structural" base, but it is necessary to create many layers and, between one another, allow adequate drying;
  flexography: a technique similar to inkjet, without the disadvantage of slowness, but also in this case the ink tends to penetrate into the fabric and can not close the holes between the weft and the warp, so disadvantageously, it is not possible to have an adequate support layer both at a structural level and at a waterproofing level;
  spray technique: tends to stiffen the fabric;
  coating technique: it is useful only for large-scale work, it does not allow the device to be made in a localized area, it creates a uniform layer over the whole fabric;
  3D printing technique: long processing times, the applied dielectric material is excessively rigid with respect to the fabric.

Furthermore, it has been verified that by using a TPU with a thickness of substantially 85 microns (with a range of values from 25 microns to 2 mm) the problem of folds or post-stretching wrinkles is further improved.

It should be noted that even thinner materials as long as they are thermoadhesive polymeric materials, even non-polyurethane based, such as PVC, with thickness of, for example, 25 microns, provided they have sufficient thickness to ensure adhesion and remain floating with respect to the fabric, may be suitable for the purpose.

Obviously you can use TPU with higher thickness but going to reduce the flexibility of the device.

In particular, this category of materials will be, in the present patent of improvement, always applied with a specific thickness, both to give structure and to waterproof the device.

Generally, it should be noted that any polymeric material may be suitable for the purpose, here reference is made to those considered most advantageous, without detracting from the scope of protection of the present invention.

In particular, the TPUs of interest herein have among the features useful to the present invention, which previously had not been specified, the fact of having at least one side with the glue which succeeds in penetrating into the fabric, making it well adherent and a substantially smooth layer which remains facing the side opposite the fabric.

It is advantageously on this second side that the aluminum foil is applied in the innovative process described herein, said smooth side allows a slight sliding (in the order of microns) of the foil on the dielectric element, this improves the response to possible bending of the device leaving reassembly margins between the elements, thus reducing, in a particularly advantageous way, the breakings of the device. Furthermore, this also reduces the wrinkle effect on the surface of the fabric from the outer side, this by applying a TPU with the characteristics indicated above and with a particular thickness (indicated above); the TPU chosen is an optimal compromise between flexibility and resistance.

Tests with other materials have shown that, after intensive use of the device, it was impossible to remove the folds. Substantially it turned out that the greater the thickness is, the smaller obviously is the aesthetic defect but to the detriment of the flexibility and softness of the device.

In contrast to the previous invention, in this case, also the closing dielectric layer, which here preferably is always made of TPU, and even more preferably, is an element of TPU with a thickness of c.a. of 250 micron (with a range from 25 to 250 microns), is applied by means of a thermo-press, since other techniques described in the previous patent do not guarantee the mechanical seal of the rigid electronic module in the assigned position, which results in non-functional and useless techniques In a further advantageous and innovative manner, a dielectric element having a surface preferably lower than the surface of the closing dielectric element has been realized for the present device of the relative system and relative method; the reduction of the surface can be achieved in any manner suitable for the purpose, for example by conferring to the base dielectric element a shape with a particular shape, for example of a "butterfly" type (as will be shown hereinafter in the figures); substantially irrespective of the shape, the geometry of the base element must advantageously allow free spaces between the fabric and the upper dielectric closing layer, so that the upper closure layer can also be welded onto the fabric, advantageously increasing the seal. In addition, the rigidity of the module is reduced and even further advantageously, by virtue of said welding, the areas of possible water infiltration are reduced to a minimum, so that the waterproofing of the electronic part is increased.

It should be noted that this is an extremely important advantage with respect to the previous invention, since the device will often be applied to a wearable or otherwise washable garment, thereby increasing the life of the device by increasing the waterproofing of the electronic part.

Further, with respect to the previous invention, the method and device described by the present invention comprise an innovative variant in which the dielectric element is made of kapton having a thickness preferably ranging from 25 to 50 microns; in this case on the side between kapton element and fabric an empty space is created, the kapton is therefore not glued to the fabric; subsequently the foil is applied, on it at least one rigid electronic module and finally the closing layer, preferably made of TPU (the details will be described below with reference to the attached figures); it will be the TPU closure layer that will encapsulate every other element giving compactness to the device. In this embodiment, in a particularly advantageous way, the flexibility of the innovative electronic device is much greater than the flexibility of the basic electronic device. On the other hand, in the area where the device is applied, it is not possible to iron the fabric, this creates a predominantly aesthetic problem, not a functional problem; whereby this solution is advantageously applied when the device remains hidden from view. Note that kapton also has excellent moisture resistance.

Still in a particularly advantageous and innovative manner, a variant of the present process and of the relative device comprises the coupling of the aluminum foil layer to the base TPU layer, or basic dielectric layer by punching both elements together before application on the layer of fabric that serves as a base.

This is particularly advantageous in terms of production, since it avoids the presence of thin aluminum foils, and therefore extremely difficult to handle and move during assembly of the device.

This would also advantageously allow to stock previously worked semi-finished products to be applied directly onto the fabric in the following step.

The semi-finished products are in this embodiment preferably composed of:

base TPU layer (butterfly or not)
aluminum foil
rigid module

Therefore during the process there are the phases of:
realization of the semi-finished base TPU and aluminum foil with rigid module;
assembly with fabric (in the ways that will be described below);
closure with upper TPU layer.

Furthermore, in a further advantageous and innovative way, in a variant embodiment of the innovative process for digitalizing the fabrics, the part of the manufacturing process of the innovative electronic device is split off from the direct application on the fabric during construction; whereby an assembly is substantially provided comprising at least a layer of base dielectric material, a foil and corresponding electronic module and the dielectric covering layer.

Said assembly can advantageously be applied to a fabric having the characteristics suitable for the purpose in a second step of the process.

In this way, advantageously, producing times are considerably reduced and some manufacturing difficulties are further eliminated.

Therefore during the procedure there are the phases of:
realization of the semi-finished electronic device comprising at least a base dielectric layer, an aluminum foil with a rigid module and a dielectric closing layer;
assembly with fabric (in the ways described below).

Having inventories of innovative assemblies or electronic devices in a preferred pre-packaged variant allows to considerably reduce processing times for customers who supply a fabric on which the devices are simply applied, instead of making them one by one on the fabric; yet, given that often the fabrics are printed, colored and/or customized at the customer's request, if the devices are already pre-packaged, the processing time when the order arrives are reduced only to the personalization of the fabric and to the subsequent application of the electronic device.

It is obvious that the fabrics used must have at least the characteristics of zero or substantially zero elongation and resistance to working at high temperatures—substantially up to 200 degrees centigrade.

The textile memory system is completed by applying the electronic device with thermo-pressing e.g. at 150-160° C. for 15-20 seconds. Or preferably with ultrasound for about 4 seconds of application.

Therefore, in a particularly advantageous way, in this case the semi-finished products are prepared on a line and are assembled only when the printed fabrics arrive in the company reducing the overall production time.

The entire production process is speeded up as the times of the various heat press operations are saved (about 60 seconds if all the steps are added) which in the innovative version are reduced to only 1 (for a total of 20 seconds).

It should also be noted that, in a further advantageous and innovative way, the applicant now preferably uses two types of TPUs:

A first type of TPU, the one used for the base layer is a preferably a 90 micron TPU composed of a "glue" layer and a non-adhesive elastic lyner layer. This material penetrates inside the fabric for about two thirds of the thickness and remains lifted from the fabric for about 25 microns.

A second type of TPU, preferably used for the covering layer, is a 250 micron TPU also composed of a layer of glue and a non-adhesive elastic lyner. This product is composed of about 50 microns of glue that melts into the fabric and the lower layers of the device while the rest, then 200 microns, allow you to fix the sheet and the rigid module well without tearing (the rigid module on the edges could cut this material). Even thinner (90 microns) but much more elastic materials are under test; advantageously these materials allow to increase the overall flexibility of the device and being more elastic, avoid cutting themselves with the rigid module.

Figure 4A:
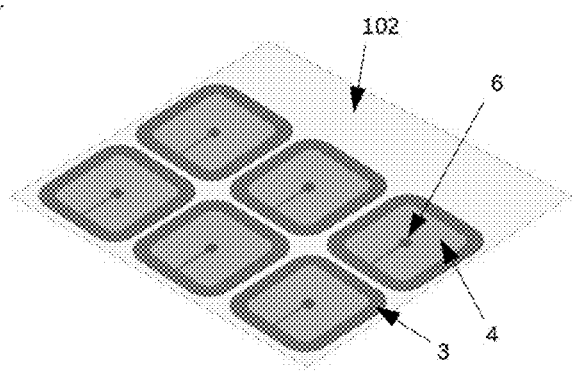
Figure 3B:
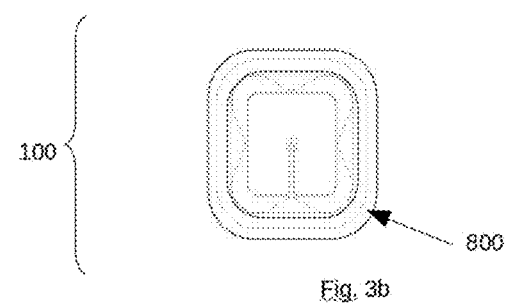
Figure 4B:
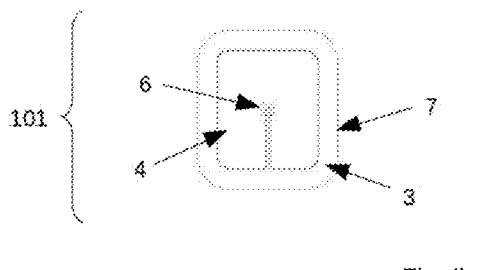

These and further advantages related to the innovative fabric memory system and related process for the digitalization of innovative fabrics will be better highlighted and described with reference to the attached figures in which:

In FIGS. 1a and 1b represent an exploded view and a plan view of a first preferred embodiment of the system described by the present invention;

in FIGS. 2a and 2b represent an exploded view and a plan view of a second preferred embodiment of the system described by the present invention;

in FIGS. 3a and 3b represent an exploded view and a plan view of a third preferred embodiment of the system described by the present invention;

in FIGS. 4a and 4b represent an exploded view and a plan view of a fourth preferred embodiment of the system described by the present invention;

in FIGS. 5a and 5b represent an exploded view and a plan view of a fifth preferred embodiment of the system described by the present invention;

in FIGS. 6a and 6b represent an exploded view and a plan view of a sixth preferred embodiment of the system described by the present invention;

in FIGS. 7a and 7b represent an exploded view and a plan view of a seventh preferred embodiment of the system described by the present invention;

and in FIG. 8 represents a further embodiment of the innovative system described by the present invention.

With reference to FIG. 1 (model 1), there is represented the basic model of the memory system 1 for fabrics described by the present invention in view from the top and exploded; in particular, said system comprises at least one fabric layer 2, a layer of dielectric element 3, here shaped preferably in a "butterfly" shape, a foil 4 comprising a slit 5, at least one rigid electronic module 6 and at least one upper dielectric layer closing 7.

In particular, the innovative advantages concerning the shape and the surface extension of the base dielectric layer, as well as the innovative advantages deriving from the type of fabric applied, that is, with substantially zero or no elongation, or the advantageous and innovative aspects of the system of Fabric memory described by the present invention, have been widely described above, here greater attention will be paid to the innovative aspects of the fabric digitalization process described by the present invention. In particular, this procedure for the system of model of type 1 comprises at least the steps of:

fabric 2 sizing or fabric roll processing;
pre-forming of the TPU 3 basic dielectric layer (model with a non-gluing side described previously) with a punch, laser cutting or mechanical cutting etc., construction with defined shape (base Sdie)<(Sdie closing);
hot application of the TPU layer with hot heat press (15 seconds at 55° C. for example)
or
with ultrasound system;

The ultrasonic system is advantageous because it lowers the overall working temperature of the processing and accelerates the time (4 seconds at room temperature).

pre-forming of aluminum foil 4 through die-cutting, laser cutting or mechanical cutting;
positioning of the foil centering it on the base TPU layer 3 with a numerical control or pick&place system;
(A variant includes the passage with heat press at 150° C. for 1-2 seconds to make the foil adhere well to the TPU).
gluing phase; a glue point is given with the machine;
positioning of the rigid electronic module 6 using pick&place;
pre-forming of the second layer 7 of dielectric closing TPU, always by means of die-cutting, laser cutting or mechanical cutting;
the TPU closing layer 7 is placed and heated at 155° C. for 15 seconds.

Subsequently the system 1 (and all the following systems so realized) will be assembled by stitching, or by other methods explained below, from the side of the closing layer TPU 7, for which the system 1 "visually" (and all other forms of realization) are mounted on the "reverse side" with respect to the figures.

Therefore, the fabric 2 can advantageously be printed with any logo or pattern of the receiving fabric in such a way as to be practically invisible.

In this configuration the system 1 is made directly on the base fabric 2, and a fabric edge 2 is obtained which exceeds the area of realization of the electronic device D of 5 mm in order to allow the subsequent stitching on a garment or other textile support.

In FIG. 2 (model 2) there is shown a second particularly preferred embodiment of the fabric memory system 10 described by the present invention. In particular, in this embodiment the system 10 further comprises, placed above the closing dielectric layer 7, a further layer 80 of heat-sealable biadhesive material to make the system 10 adhere to a fabric T on which it is subsequently applied.

In particular, in this embodiment the innovative process for digitalizing the fabrics comprises at least the steps of:
sizing of fabric 2 or fabric roll processing;
pre-forming of the TPU basic dielectric layer (model in this case with a non-gluing side described above) by means of a punch, or laser cutting or mechanical cutting,
hot application of the TPU layer with heat press (15 seconds at 55° C. for example) or with an ultrasound system;
pre-forming of aluminum foil 4 through die-cutting, laser cutting or mechanical cutting;
positioning of the foil 4 centering it on the base layer 3 TPU with a numerical control system or pick&place;
(A variant includes the passage with heat press at 150° C. for 1-2 seconds to make the foil adhere well to the TPU);
gluing phase: a glue point is given with the machine;
positioning of the rigid electronic module 6 by pick&place;
pre-forming of the closing dielectric TPU material layer 7, always by means of punching, laser cutting or mechanical cutting;
positioning and heat-sealing of the upper closing layer 7 of TPU at 155° C. for 15 seconds;
pre-forming with a punch or laser cutting a layer of thermo-bi-adhesive material 80 and positioning with a numerical control system over the closing layer 7 of TPU;
hot pressing with thermo-press (range from 100 to 150° C. for 1-15 seconds) or coupling with an ultrasonic system of the adhesive layer 80 with the rest of the device, to form said system 10.

It should be noted that for this specific processing a thermostabilized PET film is used with a detaching material since the material, being adhesive on one side, must maintain the glue but at the same time adhere to the fabric of the fabric memory system. By virtue of this film, the remaining "solid" glue is active only when the system is thermowelded to the garment (typically at 150-160° C. for 15-20 seconds). The layer 80 is completely melted allowing the adhesion of the system, for example, on a t-shirt in a solid manner. It should be noted that it is not possible to directly realize the system on a jersey, generally because the fabric of the t-shirts is substantially elastic and does not guarantee the mechanical structure which the device requires.

FIGS. 3*a* and 3*b* (model 3) show a variant of the embodiment of FIGS. 2*a* and 2*b*, or a further particularly preferred embodiment of the fabric memory system 100 described by the present invention. In particular, in this embodiment the system comprises a "crown" 800 of material suitable for welding the fabric memory system 100 to the head to which it will be destined. In this case, the layer of thermo-sealing material 800 does not remain positioned under the system 100, but rather forms a crown around the area of installation of the system; the system 100 is fixed to the heat-sealing material layer in turn by means of heat pressing with a temperature range from 100 to 150° C. for a period of from 1 to 15 seconds or through ultrasound for an application time from 1 to 12 seconds.

In this way the flexibility of the system is not reduced, the joint between the base fabric 2 of the system and the recipient fabric is hidden by the thermo-welded crown which creates a polyurethane layer along the junction with considerable technical and aesthetic improvement.

In particular, in this embodiment the innovative process for digitalizing the fabrics comprises at least the steps of:
fabric sizing or fabric roll processing 2;
pre-forming of the TPU dielectric base layer 3 (a model with a non-gluing side described previously) with a punch, or laser cutting or mechanical cutting, etc;
hot application of the TPU 3 base layer on fabric 2 with heat press (15 seconds at 155° C. for example) or with ultrasound system (advantageous as it lowers the overall working temperature of the processing and accelerates the time (4 seconds to room temperature);
pre-forming of aluminum foil 4 through die-cutting, laser cutting or mechanical cutting;
positioning of the foil centering it on the TPU layer 3 with a numerical control system or pick&place;
(A variant includes the passage with heat press at 150° C. for 1-2 seconds to make the foil adhere well to the TPU).
gluing phase; point glue given with a machine suitable for gluing;
positioning the rigid electronic module 6 using pick&place;
pre-forming of the dielectric TPU material layer 7, always closing by means of punching, laser cutting or mechanical cutting;
positioning and heat-sealing of the second layer of TPU at 155° C. for approximately 15 seconds;
(note that the ranges are generally in general from 80-90 to 180° C. for a time that varies from 4/5 seconds to 20/25 depending on the heat required for adhesion);
pre-forming with punch or laser cutting a layer of thermo-sealing TPU material 800 in the shape of a "crown";
positioning of the fabric memory system on this "crown" and centering of the assembly=system 100 comprising the crown 800.

Note that the surface of the fabric 2 remains completely inscribed in the crown 800, the crown 800 (as shown above) remains overlapped by 2.5 mm from the edge of the inner perimeter on the assembly and remains overlapped by 2.5 mm from the external perimeter on the support (whereby said crown 800 remains partially overlapped on the system 100 and partially superimposed on the fabric or support T.
heating with thermo-press (at 100/120° C. for 1-3 seconds) of the assembly that serves to pre-glue the crown on the system and then weld onto the support fabric T subsequently by heat press (or the same procedure in particular cases can be carried out with an ultrasound system);
welding on the support (mesh or T fabric) with a temperature range from 100 to 180° C. for a period of 3/4 to 25 seconds using a heat press. If the support is in polyester it is possible to weld also ultrasound for a time range of 3 to 15 seconds.

It should be noted that the further advantage of ultrasounds is that they only operate where they are needed, that is, they bond the thermoadhesive material to the fabric of the device but do not affect the rest of the material that will adhere to the garment. For this reason the use in the present invention of said technology is particularly interesting.

FIGS. 4*a* and 4*b* (model 4) show a further particularly preferred embodiment of the fabric memory system 101 described by the present invention; in particular, in this variant, in a particularly advantageous way, the fabric memory system comprises a Lyner 102 instead of a fabric base layer 2, or in this case a film (thickness from 80 microns to 4/5 mm, for example PET) which will be coupled to the dielectric base layer 3 to provide structural support to enable the finished system 101 to be moved.

In this case, the innovative process for digitalizing the fabric described by the present invention comprises at least the steps of:
unrolling the dielectric coil to form the base TPU layer 3;
positioning of the preformed foil 4 previously with a pick&place on calibrated points,
(The calibrated reference points are necessary to guarantee the correct functioning of the assembly, in fact, in order to work, the foil and the rigid module must be coupled in a very precise way to exploit the effect of the inversion of the magnetic field. Therefore the rigid module must be perfectly close to the slot with three sides slightly surmounting the foil.)
positioning and gluing of the rigid electronic module 6;
unrolling of the second closing and coupling layer 7 of TPU with the lower layers;
thermo-welding phase at a temperature range from 80-120/130° C. for 2 to 10 seconds to make the base TPU 3 with TPU 7 adhere to all elements in between. Work can also be performed using ultrasound for 2-5 seconds;
optional phase: heat-sealing by means of heated rollers which, by means of a combination of pressure and temperature, allow a slight fusion of the upper TPU material 7 and make it adhere to the whole underlying assembly. The temperature activates the sticky part of the TPU 7. (as previously indicated that the TPU is composed of a layer of glue and a "normal" polymeric layer);
cutting by laser, dies or mechanical cutting of the semi-finished products that fall into a basket and go into storage;

After passing through a heat press, programming the contents of the memory if requested by the customer via an antenna (known art).

It should be noted that both starting coils have equal widths (in this case 50 cm wide reels have been used but the process can be extended to coils even much longer (even 3 meters).

Subsequently the phases of:
hot thermo pressing (100-120° C. for about 5-6 seconds) to make the materials adhere slightly.

It should be noted that this operation can be done either by heat press or by heated rollers which couple the melting materials.

(Note that the TPU used is made of a multilayer of polyurethanes with different chemical structures and constructions. Each layer is designed to optimize adhesion with the underlying products. The first layers are mainly melting and are usually activated at a temperature around at 80 degrees. More in detail, the first immediately adheres to the fabric, the second melts at a slightly higher temperature up to the 5th layer that melts at 135° C. The upper layers are slightly thicker from 12 to 18 microns and are composed in this way: polyurethane base layer with high temperature resistance, polyurethane layer with the desired color always resistant to temperatures and protective layer also resistant to temperature.

It should be noted that, particularly advantageously, it has been verified that the chemical/physical conformation of the support added to the pressure which the heat press allows the melting materials to penetrate between the weft and the warp of the fabric, with a penetration index inversely proportional to the melting temperature of the layer (the former becomes almost liquid until the fifth layer that remains semi-solid). Once the spaces are saturated, on the surface of the fabric the other thick layers of "full" material remain in "floating".

The concept is analogous to the closing layer 7. The melting layers are able to penetrate into the base 3 because the temperature softens the upper layers of this layer and "merges" together the fused layers of the closure 7 with the base 3. The waterproofing occurs due to the saturation of the gluing layers inside the fabric and due to the solid conformation of the non-melting states.

removal of the PET support film 102 from the upper TPU layer (the layer may also remain positioned);

Note that in order to extrude the TPU there is always need of a PET support to give it a "shape". This supporting film can then be mounted on the TPU or removed to allow further processing. The TPU of the base in most of the preferred embodiments is without PET film to eliminate the phase of elimination of the film itself (impossible in the automation phase but to be done by hand). On the other hand, for the closing layer 7, the PET layer applied to the finished manufacturing process is applied as protection, and then the final customer will remove it.

positioning under a laser to cut the various single forms of semi-finished products (before this phase there is a "roll" with inside a series of sheets and rigid modules positioned and sealed at the top with the closing layer 7. To obtain the individual semi-finished parts need to be cut with the laser);

storage of the semi-finished system 101 comprising PET support film 102;

subsequently, in order to apply the semi-finished products to the fabrics to which they are destined, the semi-finished products;

positioning of the semi-finished product by means of pick&place on the destination fabric;

note that the fabric may also be in this phase in a coil and the parts of the fabric can be cut later by laser; or it is possible to place the semi-finished products on pieces already cut;

thermo-pressing of the semi-finished system 101 and T fabric at 160° C. for 15-20 seconds (or using an ultrasound welding machine for a total processing time of 4 seconds).

Also for this embodiment it is then possible to add at the end of the process the thermo-bi-adhesive (layer 80 model 2) or the crown (thermo-welding 800 model 3).

It should be noted that this innovative process can be carried out also by reversing the assembly order of the system; that is, it is possible to start from the upper dielectric closing layer, then positioning the rigid module 6 and gluing it (gluing phase) to the aluminum plate 4. Finally, the base TPU layer 3 is coupled.

However, even if possible, the phases of the innovative process are avoided, because during the pressing of the base layer of TPU 3 with the upper closure layer of TPU 7 where the foil remains between the two TPUs, said foil could break because the plate of the upper heat press is rigid (as opposed to the lower heat press plate); so by inverting the plates of the press the result would be adequate.

This occurs because the heat press which is normally used has a fixed part in heat-resistant neoprene capable of compressing even 5-6 mm and a movable part activated by a pneumatic cylinder on which a rigid metal or ceramic material plane is installed. which is heated to the desired temperature. Pressure, temperature, cycle time can be adjusted and, if necessary, also the response of the fixed plane by replacing the neoprene with a less elastic one and therefore less compressible.

In any case, the type of heat press is not considered limiting for the purposes of the present invention.

A further variant to the innovative process described herein includes, in particular, the steps of:

incision of the TPU coil to make the base 3 and obtain a shape (Sdie base)<(Sdie closure) (for example of a "butterfly" type);

elimination of waste or processing residual (namely using laser or cutting plotter to engrave the TPU without affecting the lower supporting film).

In this way it is possible to obtain a preferred embodiment, such as for example the "butterfly" shape with regard to the base TPU layer 3 without necessarily having the upper and lower layer of TPUs 7 having an identical shape.

It should be noted that it is possible in alternative embodiments to perform only one laser cutting of the reel at the end of the procedure, in which case the geometry of the base 3 of the closure 7 is the same and this does not alter the operation of the system.

Subsequently there are the steps of:
positioning of the previously pre-formed foil 4 with a pick&place on calibrated points;

positioning and gluing of the rigid electronic module 6;

unrolling the second closing layer of TPU 7 and coupling with the lower layers by means of thermo-welding with a temperature range of 80-120/130° C. from 2 to 10 seconds to make the base TPU adhere with the TPU 7 included all the elements between the two layers 3/7, alternatively machining can also be performed using ultrasound for 2-5 seconds;

alternatively, optional: thermo-welding by means of heated rollers which, by means of a combination of pressure and temperature, allow a slight melting of the upper TPU layer 7 making it adhere to the whole underlying assembly. The temperature activates the sticky part of the TPU layer 7;

It should be noted that both starting coils have equal widths (in this case 50 cm wide reels have been used, but the process can be extended to coils even much longer (even from 3 meters).

hot thermo-pressing (100-120° C. for about 5-6 seconds) to make the elements adhere provisionally to keep them in position;

It should be noted that this operation can be performed either by heat press or by heated rollers which couple the melt materials.

removal of the PET support film 102 (as above);
    positioning under a laser that cuts the various forms of semi-finished electronic product;
    stocking the semi-finished assembly system 101+PET support film 102;

Subsequently, in order to apply the semi-finished products to the fabrics for which they are destined, there are the phases of:

positioning of the semi-finished product by means of pick&place on the destination fabric;

It should be noted that the fabric may also be in a coil at this stage and the parts of the fabric may be subsequently cut by laser; or it is possible to place the semi-finished products on already cut pieces.

semi-finished and fabric thermo-pressing at 160° C. for 15-20 seconds (or using an ultra sound welding machine for a total processing time of 4 seconds).

Also for this embodiment it is then possible to add at the end of the process the 2 layers of thermoadhesive in order to make them adhere to the supports with models 2 or 3.

FIGS. 5*a* and 5*b* (model 5) show a further particularly preferred embodiment of the fabric memory system 110 described by the present invention; in particular in this variant, in a particularly advantageous manner, the fabric memory system 110 in this case comprises a base dielectric layer 310 made of kapton, for example of 25 microns or, preferably, of 50 microns.

The kapton advantageously has the capacity to replace the fabric layer 2 as a supporting structure, since it has characteristics suitable for supporting the system.

In this case, therefore, further advantageously, the base fabric 202 can also have any degree of elasticity, that is, significant, so that it is not equal to 0 or substantially zero.

In this case, the innovative process for digitalizing the fabrics described by the present invention comprises at least the steps of:

pre-forming of the layer in kapton 310 with punch, or laser cutting or mechanical cutting etc.;
    positioning of the kapton layer 310 using an equipment that creates vacuum or it can be placed on a PET thermofilm that remains attached to the kapton layer to simplify handling;
    pre-forming of aluminum foil 4 through die-cutting, laser cutting or mechanical cutting;
    positioning of the foil 4 centering it on the kapton layer 310 with a numerical control system or pick&place;
    or: a variant further comprising the passage with a heat press from 100° C. to 150° C. from 1 to 12 seconds to make the foil adhere well with the kapton layer;
    gluing phase: glue point given with a specific machine;
    positioning of the rigid electronic module 6 by pick&place;
    pre-forming of the closing layer of dielectric TPU material 7, always by means of laser cutting punches or mechanical cutting;
    positioning and heat-sealing of the second dielectric layer TPU 7 from 80° C. to 180° C. for approximately from 5 to 25 seconds;
    pre-forming with punch or laser cutting a layer of thermo-sealing TPU material 800 in the shape of a "crown";
    positioning of the fabric memory system on the "crown" and centering of the system assembly 110+crown 81.

In this way, a semi-finished product is always obtained as in the embodiment of the fabric memory system 100; the adhesion on the fabric takes place through the TPU overlap of the closing layer, that is, the closing TPU layer 7 has a larger surface than the surfaces of the underlying layers, whereby the surplus surface part is used to fix the system on the fabric of destination.

It should be noted that on the layer surface 310 of kapton, the semi-finished product does not adhere to the target fabric.

This offers a sliding effect between the system 110 and the target fabric which leads the system to be decidedly advantageously flexible.

Also for this embodiment it is then possible to add at the end of the process one of the two layers of thermoadhesive to make the system adhere to the supports, i.e. fabrics T, as described by models 2 and 3.

Furthermore, in the embodiments of FIGS. 6*a*, 6*b* and 7*a*, 7*b* (models 6 and 7) two systems 200, 220 are shown comprising a device D, formed here by a base layer 3, foil 4, module 6 and layer of closure of reduced dimensions with respect to the supporting fabric layer 2.

In the case of FIGS. 6*a* and 6*b*, a larger size of the fabric 2 is maintained to increase the so-called Brand Awareness; that is, having the smallest electronic area to the touch, the fabric 2 is softer and more pleasant.

The electronic area is only 25×25 mm compared to a 52×55 fabric.

Cutting can be done by computerized laser. This is advantageous because it is possible to realize not only an "electronic" component but also ornamental solutions printed and with particular geometries.

The rest is fabric 2 without electronic parts and is lighter and more flexible.

In the case of FIGS. 7*a* and 7*b*, one of the smallest models is shown. (For example, the system will have device D dimensions 25×25 mm, fabric 35×35 mm, module 3×3 mm)

In this case, some advantages of an embodiment of this kind is the possible insertion of the system where a smaller measure is needed, if it were a wearable garment the user would not even notice having it.

Still, advantageously, it is possible to hide the system and only the operators of the sector know its precise location, it is possible to apply the system for example to on hats and caps and for children's clothing.

On the other hand, among the disadvantages there is a more rigid structure, a smaller reading distance and a greater difficulty in the management of the aluminum foil during production.

All models of fabric memory system are supplied with a sewing solution, with a thermo-sealing solution similar to model 2 or with a thermo-sealing solution similar to model 3.

Finally, in FIG. 8 (model 8) represents the steps of the process for the digitalization of the innovative fabrics for the realization in this case of a particularly preferred embodiment, wherein the fabric memory system 300 described by the present invention is achieved by modifying some processing steps. In particular, a semi-finished product is advantageously comprising at least the base dielectric layer 3 and the aluminum foil 4. The module 6 is positioned at a later time.

In a particularly advantageous way, the realization of this semi-finished product makes it possible to avoid having to handle the aluminum foil autonomously, a factor which (as previously described) causes problems, since the foil is very thin, so fragile and difficult to handle and difficult. to be positioned, the semi-finished product thus made simplifies the movement of the foil 4.

The base layer TPU 3 can be coupled to a layer or film 103 which is used only to move the various semi-finished parts during processing. On the contrary it would be impossible to transport them because they are not mechanically structured enough to be manipulated accurately.

Processing steps starting from the coil:
unrolling the base dielectric coil 3 (previously coupled to the "transport" film 20 or layer 103;
unrolling the aluminum coil (to make the plate 4);
centering and alignment of the two coils (they must fit in the width and the unwinding axis);
pre-coupling heat-pressed medium-heat for 1-5 seconds at 80-120° C. to give a basic pre-adhesion and foil;
or
passage between two rollers also heated from 80° C. to 120° C.,
die cutting of the assembly made up of base TPU 3 and aluminum 4 (thus obtaining, for example, the incision for the "butterfly" shape of the base TPU 3 and for the geometry of the plate 4);
removal of the excess material from the semi-processed system 300 on the film or layer remains only the system 300 rigid module positioning 6;
closing with TPU 7 as described previously;
phases as described in the previous embodiments.

Note that the layer 3 of base TPU and the aluminum foil 4 should not "stick" to each other, but only adhere to one another (bonding the two layers would lose the advantage of having a smooth side of the base TPU 3).

As mentioned, once the two base dielectric layers 3 and aluminum foil 4 are coupled, these are punched.

The dies can have cutting footsteps at different heights. This allows the two materials to be etched with different shapes. Removing the scraps from the base TPU 3 and the aluminum foil 4. To remove these scraps, re-roll the roll of TPU and the scrap aluminum, so it is rolled up. only the discarded part, the foils will have their own geometry with a slit, while the base dielectric 3 (for example of a butterfly shape) will have a preferably a formed shape, maintaining a lower surface with respect to the closing dielectric layer 7.

The film or layer 103 connected to the base layer 3 of support, on the other hand, will remain intact, it is not cut to allow the assembly to be dragged.

It should be noted that a variant provides for obtaining the same result by crossing the base TPU assembly 3/aluminum foil 4 under two different lasers. In fact, to cut the metals (i.e. the aluminum foil in this case) it is necessary to use "fiber" lasers that operate at a light frequency which does not affect the basic TPU dielectric layer 3.

On the contrary, in order to cut the dielectric it is necessary to use a CO2 laser which does not advantageously cut the metals, so by properly adjusting the powers it is possible to operate on the two coupled materials without damaging them.

The remaining part of the processing is in line with the processing of models 2, 3 and 4.

It should be noted that variations in the order of carrying out the steps of the innovative process for digitalizing the fabrics, or variations in the temperatures and processing times are to be considered mere alternative embodiments to the innovative process described herein, as they are to be considered mere embodiments of the system of memory for innovative fabrics thus obtained. Further variations in materials, such as those used for the foil, such as aluminum, copper or other conductive materials, process steps, additional alternatives, machining formats, supports on which the systems are made, for which supports with adequate structure and not only textile supports are all to be considered variants embodied in the object of the present invention as better described by the appended claims.

What is claimed is:

1. A method for digitalization of fabrics and for realization of RFID systems for fabrics comprising:
    sizing of fabric or processing from a roll of fabric;
    pre-forming of a base dielectric layer in thermoadhesive or thermoplastic polyurethanes (TPU) with one of a die, or laser cutting or mechanical cutting, realization with a defined shape, Surface of die basis<Surface of die closure;
    hot application of the TPU layer with hot heat press for about 15 seconds at about 55° C.,
    application of the TPU layer with ultrasound system to lower an overall operating temperature and operating times for about 4 seconds at Tamb;
    pre-forming of an aluminum or conductive foil by one of die cutting, laser cutting or mechanical cutting;
    positioning of the foil, centering on the TPU layer with a numerical control system, or pick&place system;
    additionally passage with heat press at about 150° C. for about 1-2 seconds to adhere the foil with the TPU, in a bonding phase providing a glue point to fix a module to the foil with a dedicated machine for bonding and fixing by gluing;
    positioning a rigid electronic module using pick&place;
    pre-forming of a second closing TPU dielectric layer, that is a cover layer, using die cutting, laser cutting or mechanical cutting;
    positioning and heat-sealing of the second closing TPU dielectric layer at about 155° C. for about 15 seconds;
    assembling the RFID system by stitching, forming a side of the second closing TPU dielectric layer in TPU, the fabric being adapted to be printed with one of a logo, the fabric being realized with a fabric edge in excess of an area of creation of an electronic device to allow a subsequent sewing on a garment or another textile support.

2. The method for the digitalization of fabrics and for the realization of RFID systems for fabrics according to claim 1, wherein said process further comprises:
    pre-forming with the die or laser cutting of a layer of a thermo-bi-adhesive material and positioning of said material above the second closing TPU dielectric layer using a numerical control system;
    hot pressing with thermo-press, range from about 100 to about 150° C. for about 1 to about 15 seconds, or coupling with an ultrasonic system of an adhesive layer with the rest of the device to form said system;
    completely melting of the layer on a receiving tissue allowing adhesion of the system in jointly way.

3. The method for the digitalization of fabrics and for the realization of RFID systems for fabrics according to claim 2, wherein said process further comprises, prior to an assembly phase on at least one textile support, at least:

pre-forming with die or laser cutting of a layer of TPU thermo-welding material in a form of a crown;
positioning of a memory system for tissues on the crown and centering of the system comprising the crown;
the surface of the fabric remaining entirely inscribed in the crown, the crown remains partially superimposed on the system and also remaining partially superimposed on the support,
heating with thermo-press, at about 100/120° C. for about 1-3 seconds, of the assembly including the system 100 and the crown 800, to give a pre-bonding of the crown on the system;
welding on the support with a temperature range from about 100 to about 180° C. for a time from about 3/4 to about 25 seconds by heat press, if the fabrics in polyester also by ultrasonic welding for a time range from about 3 to about 15 seconds.

4. The method for the digitalization of fabrics and for the realization of RFID systems for fabrics according to claim 3, wherein said process comprises:
unrolling of a dielectric foil to form a basis TPU layer;
positioning of the foil with a pick&place on calibrated points;
positioning and bonding of the rigid electronic module;
unrolling of the second closing TPU dielectric layer and coupling with the lower layers;
thermo-welding phase at temperature with range from about 80-120/130° C. from about 2 to 10 seconds to adhere the base dielectric layer in TPU with the second closing TPU dielectric layer and all elements in middle, processing executable also using ultrasound for about 2-5 seconds;
additional phase comprising heat sealing through heated rollers which through a combination of pressure and temperature allow a slight melting of an upper TPU material of the second closing TPU dielectric layer making it adhere to the assembly down below, the temperature activating the sticky part of the second closing TPU dielectric layer;
laser cut, punching or mechanical cutting of semi-finished products that fall in a basket and go to warehouse;
programming contents of memory if required by a customer via an antenna, after passing in heat press;
to follow the steps of:
hot-pressing, at about 100-120° C., for about 5-6 seconds, to make the materials lightly adhere;
removal of a support PET film from the second closing TPU dielectric layer at top, wherein the film remain positioned;
positioning under a laser to cut various forms of semi-finished products;
storage on stock of semi-finished system comprising supporting PET film;
application of semi-finished system on a tissue of the tissues to which they are intended, the semi-finished products by means of:
positioning of the semi-finished products by means of pick&place on a target tissue of the tissues;
hot-pressing of semi-finished system and fabric at about 160° C. for about 15-20 seconds or using an ultrasounds welding machine for a total processing time of about 4 seconds; and
adding of a thermo-bi-adhesive layer or of the crown.

5. The method for the digitalization of fabrics and for the realization of RFID systems for fabrics according to claim 1, wherein said process comprises:
pre-forming of the base dielectric layer in-made from kapton with punch, or laser cutting or mechanical cutting etc.;
followed by
positioning of the base dielectric layer using a gear that creates vacuum or it can be placed on a PET thermofilm which remain attached to the base dielectric layer to simplify handling that remains;
pre-forming of the aluminum foil through die cutting, laser cutting or mechanical cutting;
positioning of lamina, by centering on the base dielectric layer with a numerical control system or pick&place;
or
a variant further comprising the step of heat pressing from about 100° C. to about 150° C. for about 1-12 seconds of the lamina with the layer to adhere well;
gluing phase; glue point given with a special machine;
positioning of the rigid electronic module by means of pick&place;
pre-forming of the TPU closing dielectric (closing TPU) layer through closing dies laser cutting or mechanical cutting;
positioning and heat-sealing of the closing TPU layer from about 80° C. to about 180° C. for about 5 to 25 seconds;
pre-forming with a die or laser cutting of a layer of thermo-welding TPU material in the shape of a crown;
positioning of the memory system for tissues on the crown and centering the assembly system and the crown; and
adding a thermo-bi-adhesive layer instead of the crown.

6. The method for the digitalization of fabrics and for the realization of RFID systems for fabrics according to claim 5, wherein said process comprises the steps of:
unrolling of base dielectric foil previously coupled to a transport film or layer;
unrolling of the aluminum foil for the realizing of the foil;
centering and alignment of two c foils: must match for width and unwinding axis;
pre-coupling by heat press for about 1-5 seconds at about 80-120° C. to give a pre adhesion of base dielectric layer in TPU (base TPU) and the aluminum foil;
passage between two heated rollers with temperature from about 80° C. to about 120° C.;
die-cutting assembly consisting of the base TPU and the aluminum foil, obtaining an incision in a symmetrical butterfly-wing shape of the base TPU and for a geometry of the foil;
removal of excess material from semi-finished system on the film or layer remains only the system;
positioning of the rigid electronic module;
closing with the second closing TPU dielectric layer.

7. The method for the digitalization of fabrics and for the realization RFID systems for fabrics according to claim 4, wherein said process comprises:
engraving of the TPU foil to realize the base dielectric layer and to obtain a specific shape with Surface of die basis<Surface of die closure, of the symmetrical butterfly-wing shape;
elimination of a waste or residual of processing—via laser or cutting plotter is going to engrave the TPU without affecting a lower support film obtaining a preferred embodiment i.e. the symmetrical butterfly-wing shape for the TPU layer base without necessarily having the closing TPU of the same shape;
or positioning of the foil that is pre-formed with a pick&place on calibrated points;

positioning and gluing of the rigid electronic module;

unrolling of a second sealing TPU layer and coupling with the lower layers by means of thermo-welding with temperature range from about 80-120/130° C. from about 2 to 10 seconds to adhere the base TPU with closing TPU and with all the elements in the middle—alternatively executable processing also using ultrasonic for 2-5 seconds;

hot-pressing for about 100-120° C. for about 5-6 seconds to adhere all the elements in a provisional way to keep them in position, or heating by means of heated rollers which couple fusion materials;

removal of the support PET film;

positioning under a laser to cut the various forms of semi-finished electronic system;

storage in warehouse of the semi-finished assembly system and support PET film;

subsequently to apply the semi-finished assembly to the tissues to which they are intended, there are the steps of:

positioning of the semi-finished product by means of pick&place on a target fabric;

hot-pressing of the semi-finished product and fabric at about 160° C. for about 15-20 seconds or use of an ultra sound welder for a total processing time of about 4 seconds; and adding the thermo-bi-adhesive layer or the crown.

8. The process method for the digitalization of fabrics and for the realization of memory RFID systems for fabrics according to claim 7, wherein said process comprises:

unrolling of the second sealing TPU layer and coupling with the lower layers by means of thermo-welding with temperature range from about 80-120/130° C. from about 2 to 10 seconds to adhere the base TPU with closing TPU and with all the elements in the middle-alternatively executable processing also using ultrasonic for about 2-5 seconds alternative heat-sealing by means of heated rollers that through a combination of pressure and temperature allow a slight fusion of sticky side of the closing TPU layer making it adhere to all the assembly there below;

hot-pressing for about 100-120° C. for about 5-6 seconds to adhere all the elements in the provisional way to keep them in position, or heating by means of heated rollers which couple the fusion materials;

removal of the support PET film;

positioning under a laser to cut the various forms of semi-finished electronic system;

storage in warehouse of the semi-finished assembly system and support PET film;

subsequently to apply the semi-finished assembly to the tissues to which they are intended, there are the steps of:

positioning of the semi-finished product by means of pick&place on the target fabric;

hot-pressing of the semi-finished product and fabric at about 160° C. for about 15-20 seconds—or use of an ultra sound welder for a total processing time of about 4 seconds; and adding the thermo-bi-adhesive layer or the crown.

9. The method for the digitalization of fabrics and for the realization of memory systems for fabrics according to claim 1, wherein said process comprises the steps of:

performing a single foil laser cutting at the end of procedure for both the base layer of dielectric and for a closing layer of dielectric thus obtaining the same geometry for the base layer and for the closing layer of dielectric, this without modifying the functioning of the system.

* * * * *